US007817148B2

(12) United States Patent
Kojima et al.

(10) Patent No.: US 7,817,148 B2
(45) Date of Patent: Oct. 19, 2010

(54) VOLTAGE GENERATING SYSTEM

(75) Inventors: Tomokazu Kojima, Osaka (JP); Hiroshi Kojima, Kyoto (JP); Tetsuro Omori, Osaka (JP)

(73) Assignee: Panasonic Corporation, Osaka (JP)

( * ) Notice: Subject to any disclaimer, the term of this patent is extended or adjusted under 35 U.S.C. 154(b) by 952 days.

(21) Appl. No.: 11/651,962

(22) Filed: Jan. 11, 2007

(65) Prior Publication Data

US 2007/0159475 A1 Jul. 12, 2007

(30) Foreign Application Priority Data

Jan. 11, 2006 (JP) ............................. 2006-003392

(51) Int. Cl.
*G06F 3/038* (2006.01)

(52) U.S. Cl. ........................... 345/211; 345/96; 322/28; 365/189.09

(58) Field of Classification Search ........... 345/87-100, 345/204, 211-213; 322/28; 365/189.09
See application file for complete search history.

(56) References Cited

U.S. PATENT DOCUMENTS 6,329,797 B1 * 12/2001 Bluemel et al. ............... 322/28
7,142,182 B2 * 11/2006 Aoki et al. .................... 345/87
7,609,256 B2 * 10/2009 Morita ....................... 345/211
2002/0008686 A1 1/2002 Kumada et al.
2002/0097236 A1 * 7/2002 Aoki et al. .................. 345/204
2003/0122766 A1 * 7/2003 Pulvirenti .................... 345/95
2003/0132906 A1 * 7/2003 Tanaka et al. ................ 345/89
2005/0007393 A1 1/2005 Akai et al.
2005/0134542 A1 * 6/2005 Iitsuka ........................ 345/98
2005/0225573 A1 10/2005 Kudo et al.
2006/0145986 A1 * 7/2006 Oh et al. ....................... 345/92
2007/0001972 A1 * 1/2007 Kumagai et al. .............. 345/98

FOREIGN PATENT DOCUMENTS

JP 2001-236127 8/2001
JP 2005-181461 7/2005

* cited by examiner

*Primary Examiner*—Kimnhung Nguyen
(74) *Attorney, Agent, or Firm*—McDermott Will & Emery LLP

(57) ABSTRACT

A voltage generating system has a first voltage generating device for generating a plurality of voltages between a maximum voltage and a minimum voltage as a first set of voltages, and a second voltage generating device for generating a plurality of voltages between the maximum voltage and the minimum voltage as a second set of voltages, the second set of voltages being different from the first set of voltages. The first voltage generating device generates the maximum voltage, and supplies the first set of voltages and the maximum voltage to the second voltage generating device. The second voltage generating device generates the minimum voltage, and supplies the second set of voltages and the minimum voltage to the first voltage generating device. The first and second voltage generating devices each select a voltage from the first and second sets of voltages, and output the selected voltage.

8 Claims, 11 Drawing Sheets

VOLTAGE GENERATING SYSTEM

CROSS REFERENCE TO RELATED APPLICATIONS

This Non-provisional application relates to Patent Application No. 2006-345921 filed in Japan on Dec. 22, 2006, the entire contents of which are hereby incorporated by reference.

BACKGROUND OF THE INVENTION

The present invention relates to a voltage generating system for generating a plurality of voltages.

There is a known power supply circuit which uses a single integrated circuit (IC) to generate and supply a plurality of voltages to a display device or the like. The power supply circuit controls each voltage, depending on whether or not a device to which the voltage is supplied is operating (see, for example, Japanese Unexamined Patent Application Publication No. 2001-236127).

When a current output-type semiconductor circuit outputs a small current, charging and discharging of a source signal line of a liquid crystal display driver, an electro-luminescent (EL) display device or the like cannot be sufficiently performed. Therefore, there is a known circuit in which, when a current cannot be changed up to a value corresponding to a predetermined gradation during a horizontal scanning period, a voltage corresponding to a gradation level is initially supplied so as to obtain a desired current (see, for example, Japanese Unexamined Patent Application Publication No. 2005-181461).

On the other hand, as large-sized and higher-definition display devices have been developed in recent years, a plurality of ICs are used to generate a plurality of voltages so as to drive the display device. When the size of a display device is increased, a plurality of ICs need to be provided in the vicinity of the display device so as to drive the display device since the number of terminals and the size of a circuit for driving the display device are also increased. For such a power supply circuit comprising a plurality of ICs, it is necessary to eliminate differences between voltages generated by the separate ICs.

FIG. 14 is a block diagram illustrating a configuration of a conventional voltage generating system. The voltage generating system of FIG. 14 comprises voltage generating devices 91 and 92. The voltage generating devices 91 and 92 each generate N voltages (N is an integer of two or more), and outputs M (M is an integer of two or more) of the N voltages to a display device 94. The voltage generating devices 91 and 92 belong to different IC chips.

FIG. 15 is a block diagram illustrating an exemplary configuration of the voltage generating device 91 of FIG. 14. The voltage generating device 91 comprises a maximum and minimum voltage generating section 96, an intermediate voltage generating section 97, and a voltage selecting section 98. The maximum and minimum voltage generating section 96 generates and outputs a maximum voltage VMAX and a minimum voltage VMIN to the intermediate voltage generating section 97.

Based on the maximum voltage VMAX and the minimum voltage VMIN, the intermediate voltage generating section 97 generates and outputs voltages V[1], V[2], . . . , V[N] (hereinafter collectively referred to as voltages V[1:N]) to the voltage selecting section 98. In the intermediate voltage generating section 97, for example, the maximum voltage VMAX and the minimum voltage VMIN are input to a circuit in which a plurality of resistors are connected in series, and a voltage of a connection point between each resistor is impedance-converted and output by an operational amplifier. The voltage selecting section 98 selects and outputs M of the voltages V[1:N] to the display device 94. The voltage generating device 92 has the same configuration.

However, characteristics of a device included in an IC vary from IC to IC, and therefore, characteristics of the resistors and the operational amplifier of the intermediate voltage generating section 97 vary between the voltage generating devices 91 and 92. Also, the maximum voltage VMAX and the minimum voltage VMIN may also vary between the voltage generating devices 91 and 92. Therefore, the voltages V[1:N] output from the voltage generating device 91 may not be equal to the voltages V[1:N] output from the voltage generating device 92.

In the case of display devices, an error in the supplied voltages V[1:N] is desired to be, for example, 10% or less. However, according to the configuration of FIG. 14, this criterion may not be satisfied due to a variation in semiconductor process.

SUMMARY OF THE INVENTION

An object of the present invention is to provide a voltage generating system in which a plurality of voltage generating devices can each output a plurality of voltages, and the output voltage does not vary between the voltage generating devices.

The present invention comprises first and second voltage generating devices. The first and second voltage generating devices each generate a plurality of voltages and supply the generated voltages to each other. The first and second voltage generating devices each select a required voltage from the voltages generated by the first voltage generating device and the voltages generated by the second voltage generating device, and output the selected voltage.

More specifically, a voltage generating system of the present invention comprises a first voltage generating device for generating a plurality of voltages between a maximum voltage and a minimum voltage as a first set of voltages, and a second voltage generating device for generating a plurality of voltages between the maximum voltage and the minimum voltage as a second set of voltages, the second set of voltages being different from the first set of voltages. The first voltage generating device generates the maximum voltage, and supplies the first set of voltages and the maximum voltage to the second voltage generating device. The second voltage generating device generates the minimum voltage, and supplies the second set of voltages and the minimum voltage to the first voltage generating device. The first and second voltage generating devices each select a voltage from the first and second sets of voltages, and output the selected voltage.

Thus, the first and second voltage generating devices output the same voltage which is generated by one of the first and second voltage generating devices. Therefore, when a voltage is output from each of the two voltage generating devices, it is possible to eliminate a variation in output voltage between these voltage generating devices. Also, it is sufficient to use all of two voltage generating devices to generate required voltages, thereby making it possible to suppress the circuit area and the power consumption.

Another voltage generating system of the present invention comprises a first voltage generating device for generating a plurality of voltages between a maximum voltage and a minimum voltage as a first set of voltages, a second voltage generating device for generating a plurality of voltages between the maximum voltage and the minimum voltage as a second set of voltages, the second set of voltages being different from the first set of voltages, and a third voltage generating device for generating a plurality of voltages between the maximum voltage and the minimum voltage as a third set of voltages, the third set of voltages being different from the first and second sets of voltages. The first voltage generating device generates the maximum voltage, and supplies the first set of voltages and the maximum voltage to the second and third voltage generating devices. The second voltage generating device generates the minimum voltage, and supplies the second set of voltages and the minimum voltage to the first and third voltage generating devices. The third voltage generating device supplies the third set of voltages to the first and second voltage generating devices. The first to third voltage generating devices each select a voltage from the first to third sets of voltages, and output the selected voltage.

Thereby, it is possible to eliminate a variation in output voltage between the first to third voltage generating devices.

According to the present invention, when a voltage is output from each of a plurality of voltage generating devices, it is possible to eliminate a variation in output voltage between the voltage generating devices. Further, it is sufficient to use all of a plurality of voltage generating devices to generate required voltages, thereby making it possible to suppress the circuit area and the power consumption. Furthermore, a circuit for driving a display device is simplified, thereby making it possible to reduce a size (width) of a frame around a screen of a liquid crystal display device, an EL display device or the like.

DETAILED DESCRIPTION OF THE PREFERRED EMBODIMENTS

Hereinafter, embodiments of the present invention will be described with reference to the accompanying drawings.

First Embodiment

Figure 1:
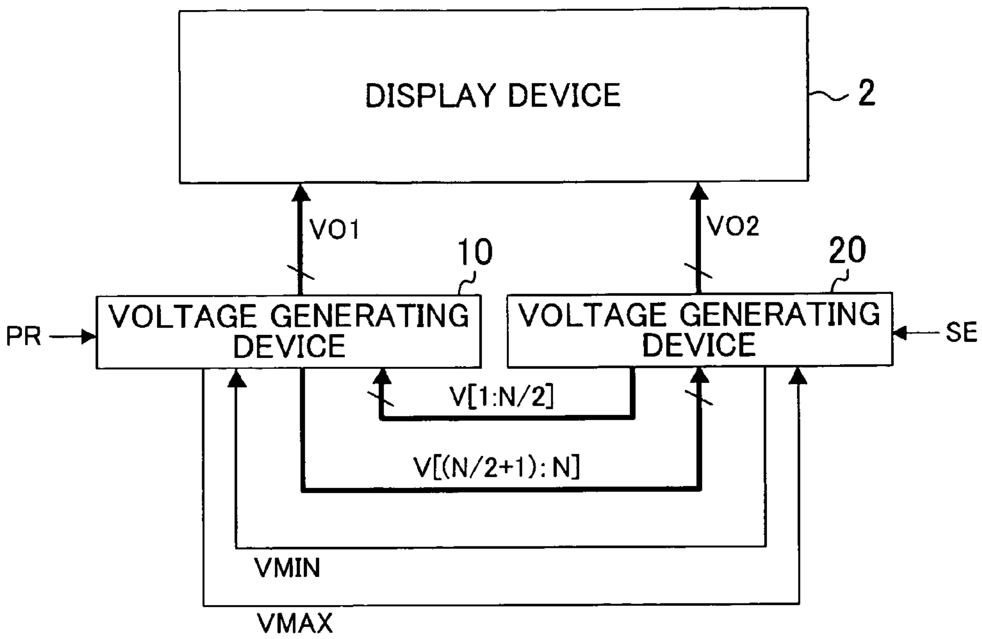
FIG. 1 is a block diagram illustrating a configuration of a voltage generating system according to a first embodiment of the present invention.

FIG. 1 is a block diagram illustrating a configuration of a voltage generating system according to a first embodiment of the present invention. The voltage generating system of FIG. 1 comprises voltage generating devices 10 and 20. The voltage generating 20 device 10 generates and supplies a maximum voltage VMAX to the voltage generating device 20. The voltage generating device 20 generates and outputs a minimum voltage VMIN to the voltage generating device 10.

Based on the maximum voltage VMAX and the minimum voltage VMIN, the voltage generating device 10 generates a plurality of voltages between these voltages, and supplies the generated voltages as voltages V[(N/2+1):N] (N is an integer of two or more) to the voltage generating device 20. Based on the maximum voltage VMAX and the minimum voltage VMIN, the voltage generating device 20 generates a plurality of voltages (voltages different from the voltages V[(N/2+1):N]) between these voltages, and outputs the generated voltages as voltages V[1:N/2] to the voltage generating device 10. The voltages V[1:N] may include the maximum voltage VMAX and the minimum voltage VMIN.

The voltage generating devices 10 and 20 select voltages required for a display device 2 from the voltages V[1:N], and output the selected voltages as voltages VO1 and VO2 to the display device 2, respectively. The voltage generating device 10 and the voltage generating device 20 belong to different IC chips.

Figure 2:
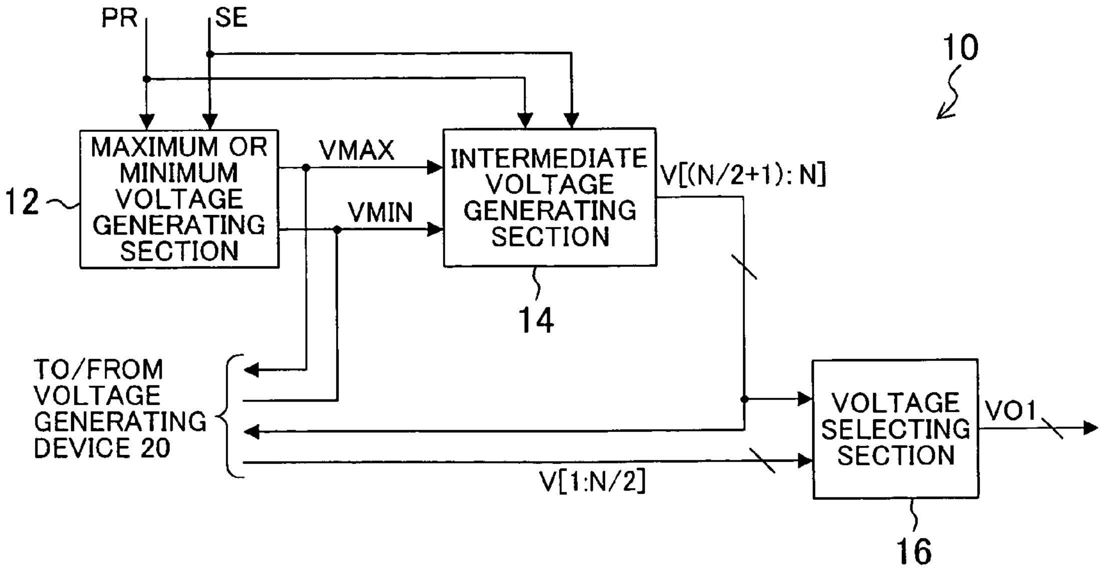
FIG. 2 is a block diagram illustrating an exemplary configuration of a voltage generating device of FIG. 1.

FIG. 2 is a block diagram illustrating an exemplary configuration of the voltage generating device 10 of FIG. 1. The voltage generating device 10 comprises a maximum or minimum voltage generating section 12, an intermediate voltage generating section 14, and a voltage selecting section 16. The voltage generating device 20 of FIG. 1 has the same configuration.

Note that a high logic level “H” is input as a chip identifying signal PR to the voltage generating device 10, while “H” is input as a chip identifying signal SE to the voltage generating device 20. In the voltage generating device 10, the maximum or minimum voltage generating section 12 outputs the maximum voltage VMAX to the intermediate voltage generating section 14 and the voltage generating device 20, and the intermediate voltage generating section 14 receives the minimum voltage VMIN from the voltage generating device 20. In the voltage generating device 20, the maximum or minimum voltage generating section 12 outputs the minimum voltage VMIN to the intermediate voltage generating section 14 and the voltage generating device 10, and the intermediate voltage generating section 14 receives the maximum voltage VMAX from the voltage generating device 10.

Also, in the voltage generating device 10, the intermediate voltage generating section 14 outputs the voltages V[(N/2+1):N] to the voltage selecting section 16 and the voltage generating device 20, and the voltage selecting section 16 receives the voltages V[1:N/2] from the voltage generating device 20. In the voltage generating device 20, the intermediate voltage generating section 14 outputs the voltages V[1:N/2] to the voltage selecting section 16 and the voltage generating device

10, and the voltage selecting section 16 receives the voltages V[(N/2+1): N] from the voltage generating device 10.

Thus, the voltage generating devices 10 and 20 have the same configuration. When the chip identifying signal PR is "H", the configuration operates as the voltage generating device 10. When the chip identifying signal SE is "H", the configuration operates as the voltage generating device 20.

Figure 3:
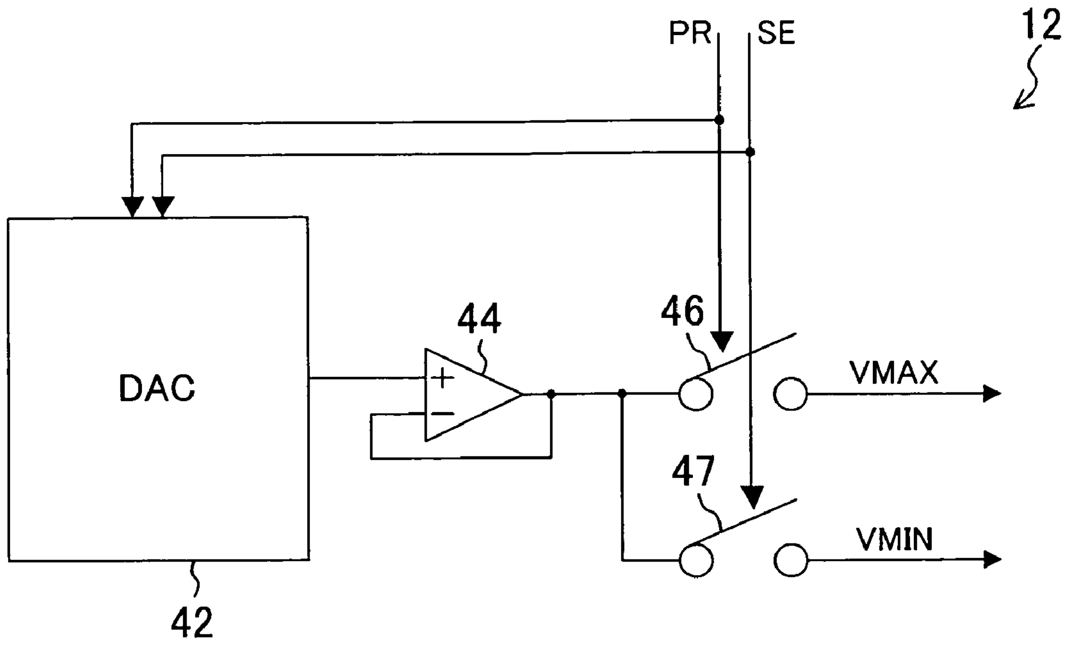
FIG. 3 is a block diagram illustrating an exemplary configuration of a maximum or minimum voltage generating section of FIG. 2.

FIG. 3 is a block diagram illustrating an exemplary configuration of the maximum or minimum voltage generating section 12 of FIG. 2. The maximum or minimum voltage generating section 12 comprises a D/A converter 42, a buffer (operational amplifier) 44, and switches 46 and 47.

The D/A converter 42 is, for example, a 6-bit D/A converter. When the chip identifying signal PR is "H", the D/A converter 42 receives "111111" as an input value, and outputs the maximum voltage VMAX (e.g., 6 V) to the buffer 44. When the chip identifying signal SE is "H", the D/A converter 42 receives "000000" as an input value, and outputs the minimum voltage VMIN (e.g., 4 V) to the buffer 44.

The buffer 44 impedance-converts an output of the D/A converter 42, and outputs the result to the switches 46 and 47. The switch 46 is turned ON when the chip identifying signal PR is "H". The switch 47 is turned ON when the chip identifying signal SE is "H".

Therefore, the maximum or minimum voltage generating section 12 outputs the maximum voltage VMAX when the chip identifying signal PR is "H", and the minimum voltage VMIN when the chip identifying signal SE is "H".

Note that another circuit which can output the maximum voltage VMAX and the minimum voltage VMIN in accordance with the chip identifying signals PR and SE, may be used instead of the D/A converter 42. For example, a circuit may be used which employs resistors to divide a voltage between a power supply voltage and a ground voltage so as to output the maximum voltage VMAX and the minimum voltage VMIN.

Figure 4:
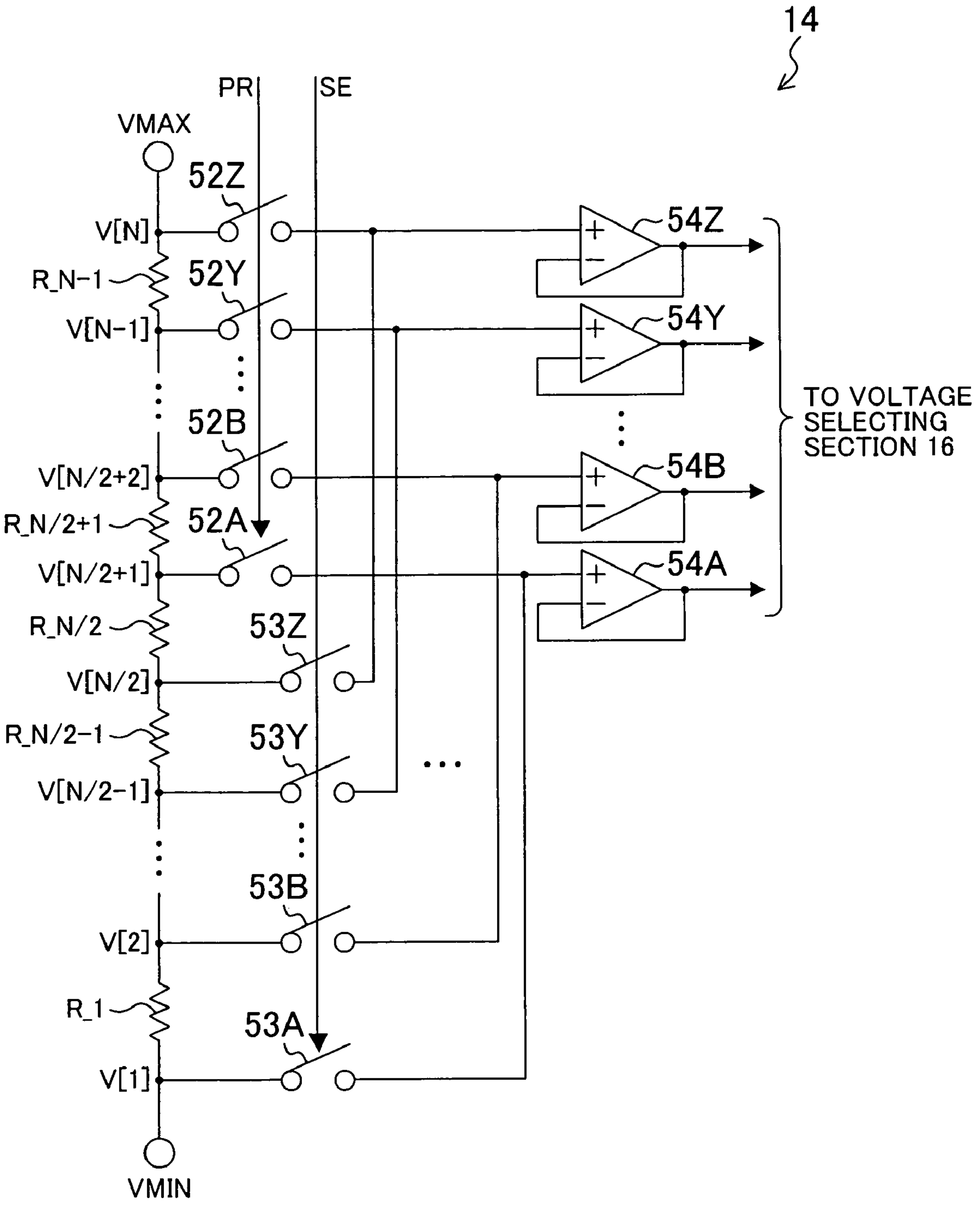
FIG. 4 is a circuit diagram illustrating an exemplary configuration of an intermediate voltage generating section of FIG. 2.

FIG. 4 is a circuit diagram illustrating an exemplary configuration of the intermediate voltage generating section 14 of FIG. 2. The intermediate voltage generating section 14 comprises N−1 resistors R_1, . . . , R_N/2−1, R_N/2, R_N/2+1, . . . , and R_N−1, and N switches 52A, 52B, . . . , 52Y, 52Z, 53A, 53B, . . . , 53Y, and 53Z, and N/2 buffers (operational amplifiers) 54A, 54B, . . . , 54Y, and 54Z.

The resistors R_1, . . . , and R_N−1 are connected in series to form a resistor circuit. The maximum voltage VMAX and the minimum voltage VMIN are input to the respective ends of the resistor circuit. It is here assumed that all of the resistors R_1, . . . , and R_N−1 have the same resistor value and that voltages at nodes where these resistors R_1, . . . , and R_N−1 are connected are represented by V[1], V[2], . . . , V[N−1], and V[N] in order of magnitude (smallest first). The voltage V[N/2] is a voltage at a middle point between the maximum voltage VMAX and the minimum voltage VMIN (an average voltage of the maximum voltage VMAX and the minimum voltage VMIN).

When the chip identifying signal PR is "H", the switches 52A to 52Z are turned ON, so that the voltages V[N/2+1], V[N/2+2], . . . , and V[N] are input to the buffers 54A to 54Z, respectively. When the chip identifying signal SE is "H", the switches 53A to 53Z are turned ON, so that the voltages V[1], V[2], . . . , and V[N/2] are input to the buffers 54A to 54Z, respectively. The buffers 54A to 54Z impedance-transform the respective voltages input thereto, and output the respective results to the voltage selecting section 16.

The voltage selecting section 16 selects voltages required for the display device 2 from the voltages V[1:N], and outputs the selected voltages. For example, when the voltage V[2] is output, the voltage generating device 20 outputs the voltage V[2] generated by the intermediate voltage generating section 14 thereof to the display device 2, and the voltage generating device 10 outputs the voltage V[2] supplied from the voltage generating device 20 to the display device 2.

Also, for example, when the voltage V[N−1] is output, the voltage generating device 10 outputs the voltage V[N−1] generated by the intermediate voltage generating section 14 thereof to the display device 2, and the voltage generating device 20 outputs the voltage V[N−1] supplied from the voltage generating device 10 to the display device 2.

Thus, the voltage generating devices 10 and 20 are configured to output the same voltage, thereby making it possible to prevent a voltage output from the voltage generating device 10 and a voltage output from the voltage generating device 20 from deviating from each other.

When all of the voltages V[1:N] are generated by each voltage generating device, N buffers are required for each voltage generating device. However, in the voltage generating system of FIG. 1, the number of buffers required for each voltage generating device is N/2. Therefore, as compared to when all the voltages V[1:N] are generated by each voltage generating device, the power consumption and the circuit area can be reduced.

Figure 5:
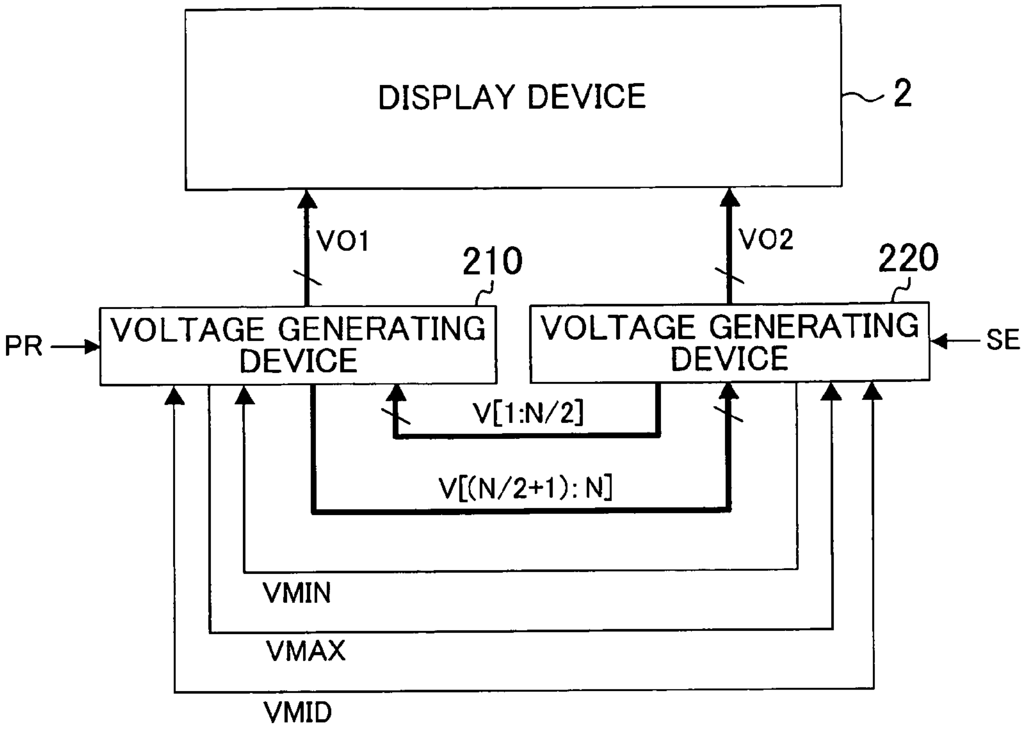
FIG. 5 is a block diagram illustrating a configuration of a variation of the voltage generating system of FIG. 1.

FIG. 5 is a block diagram illustrating a configuration of a variation of the voltage generating system of FIG. 1. The voltage generating system of FIG. 5 is the same as the voltage generating system of FIG. 1, except that voltage generating devices 210 and 220 are provided instead of the voltage generating devices 10 and 20. In the voltage generating system of FIG. 5, a pair of nodes which should have the same voltage other than the maximum voltage VMAX and the minimum voltage VMIN, between the voltage generating device 210 and the voltage generating device 220, are connected to each other. In the other regards, the voltage generating system of FIG. 5 is similar to that of FIG. 1.

Figure 6:
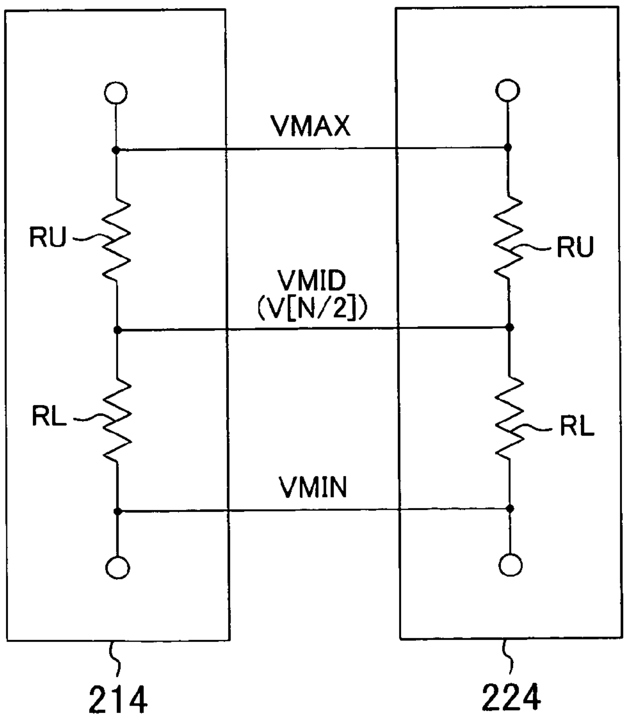
FIG. 6 is a circuit diagram illustrating an exemplary connection between two voltage generating devices of FIG. 5.

FIG. 6 is a circuit diagram illustrating an exemplary connection between the two voltage generating devices of FIG. 5. The voltage generating devices 210 and 220 of FIG. 5 comprise intermediate voltage generating sections 214 and 224, respectively, as in the intermediate voltage generating section 14 of FIG. 4. A resistor RU collectively indicates the resistors R_N/2, R_N/2+1, . . . , and R_N−1 of FIG. 4, and a resistor RL collectively indicates the resistors R_1, . . . , and R_N/2−1.

As illustrated in FIG. 6, between the intermediate voltage generating section 214 and the intermediate voltage generating section 224, a pair of nodes for an intermediate voltage VMID (voltage V[N/2]) as well as a pair of nodes to which the maximum voltage VMAX and the minimum voltage VMIN are respectively input are each connected together.

In this case, a deviation in the intermediate voltage VMID between the voltage generating devices can be substantially eliminated, thereby making it possible to reduce a variation in voltage between the voltage generating devices due to a variation in the value of the resistor. Also, the accuracy of the voltage is improved, thereby making it possible to improve the linearity of the voltages V[1:N] which are used, depending on displayed image data.

Note that the intermediate voltage VMID is not limited to the voltage V[N/2], and may be any of the voltages V[2] to V[N−1].

Figure 7:
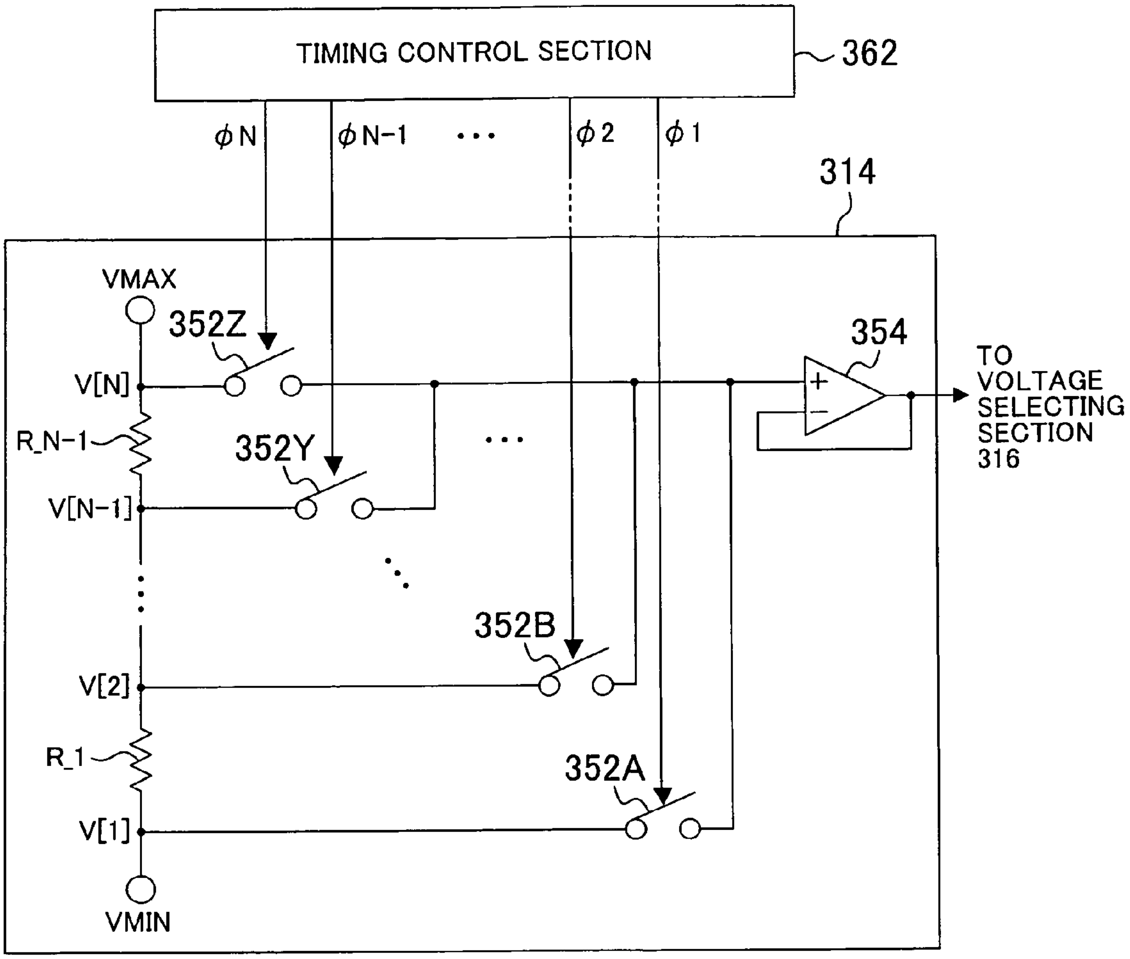
FIG. 7 is a circuit diagram illustrating a configuration of a variation of a intermediate voltage generating section of FIG. 2.

FIG. 7 is a circuit diagram illustrating a configuration of a variation of the intermediate voltage generating section 14 of FIG. 2. It is here assumed that a timing control section 362 is further provided in the voltage generating system of FIG. 1. An intermediate voltage generating section 314 of FIG. 7 is the same as the intermediate voltage generating section 14 of FIG. 4, except that N switches 352A to 352Z are provided instead of the switches 52A to 52Z and 53A to 53Z, and a buffer 354 is provided instead of the buffers 54A to 54Z .

Figure 8:
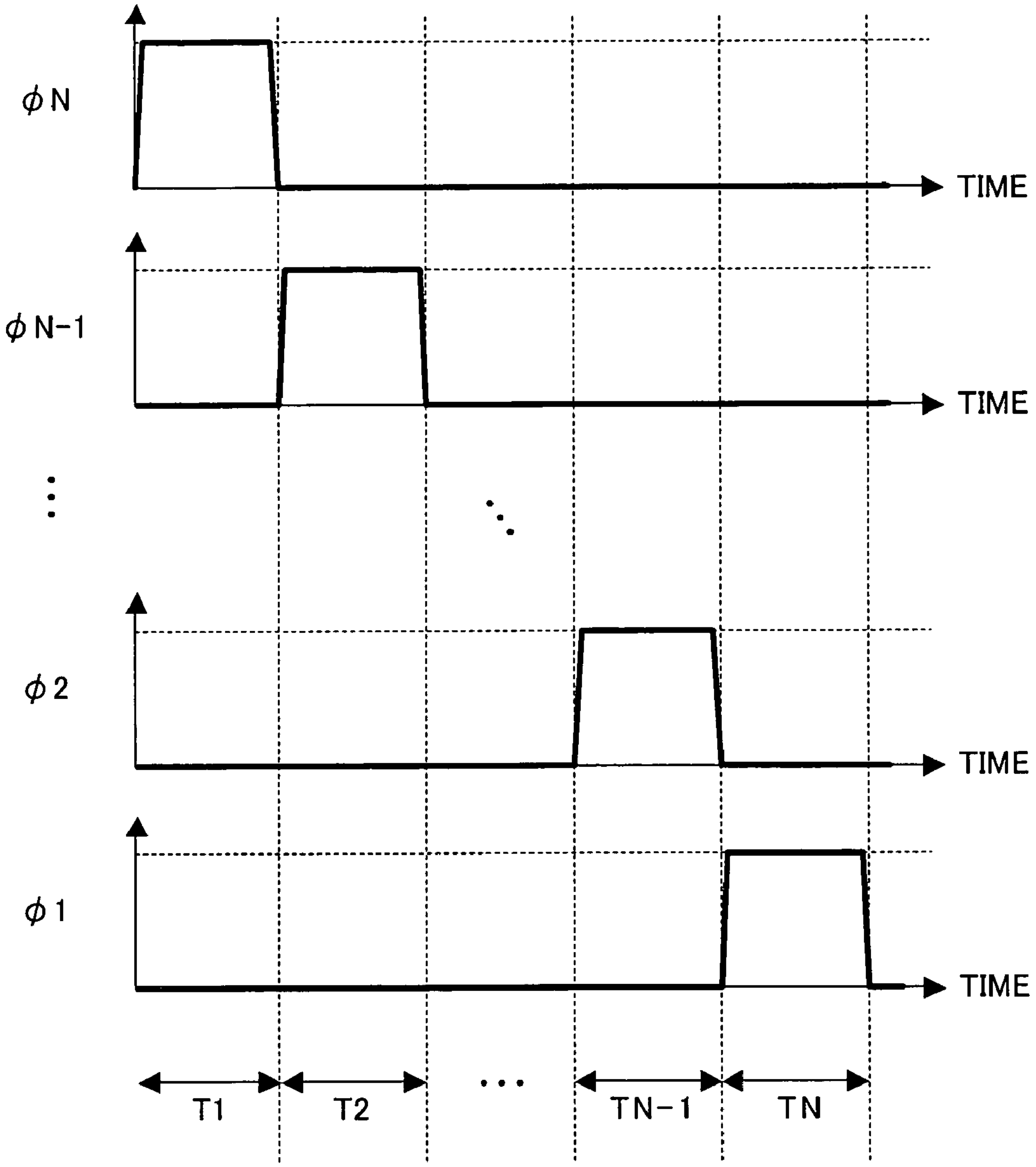
FIG. 8 is a timing chart illustrating signals output by a timing control section of FIG. 7.

FIG. 8 is a timing chart illustrating signals output by the timing control section 362 of FIG. 7. The timing control section 362 generates and outputs timing control signals ϕ1, ϕ2, . . . , and ϕN which have successive active periods ("H") as illustrated in FIG. 8. The switches 352A, 352B, . . . , and 352Z correspond to the timing control signals ϕ1, ϕ2, . . . , and ϕN, respectively, and are turned ON when the respective corresponding timing control signals are active. When a display cycle of the display device 2 is represented by T, and lengths of the periods during which the timing control signals ϕ1, ϕ2, . . . , and ϕN are "H" are represented by T1, T2, . . . , and TN, respectively, T≧T1+T2+ . . .+TN is satisfied.

The voltage generating devices 10 and 20 each comprise the intermediate voltage generating section 314 and a voltage selecting section 316 instead of the intermediate voltage generating section 14 and the voltage selecting section 16. The intermediate voltage generating section 314 of the voltage generating device 10 receives the timing control signals ϕN, ϕN−1, . . . , and ϕN/2+1, while the intermediate voltage generating section 314 of the voltage generating device 20 receives the timing control signals ϕN/2, ϕN/2−1, . . . , and ϕ1.

The timing control section 362 causes the timing control signals ϕN, ϕN−1, . . . , and ϕN/2+1 successively to go to "H" in cycles of 1/N of the display cycle T. In the voltage generating device 10, the buffer 354 impedance-converts the input voltages V[N], V[N−1], . . . , and V[N/2+1], and outputs the results successively to the voltage selecting section 316 and the voltage generating device 20.

Thereafter, the timing control section 362 causes the timing control signals ϕN/2, ϕN/2−1, . . . , and ϕ1 successively to go to "H" in cycles of 1/N of the display cycle T. In the voltage generating device 20, the buffer 354 impedance-converts the input voltage V[N/2], V[N/2−1], . . . , and V[1], and outputs the results successively to the voltage selecting section 316 and the voltage generating device 10. The voltage selecting sections 316 of the voltage generating devices 10 and 20 each successively select voltages required for the display device 2 and output the selected voltages to the display device 2.

The intermediate voltage generating section 314 of FIG. 7 comprises only one buffer, thereby making it possible to reduce the circuit area.

Figure 9:
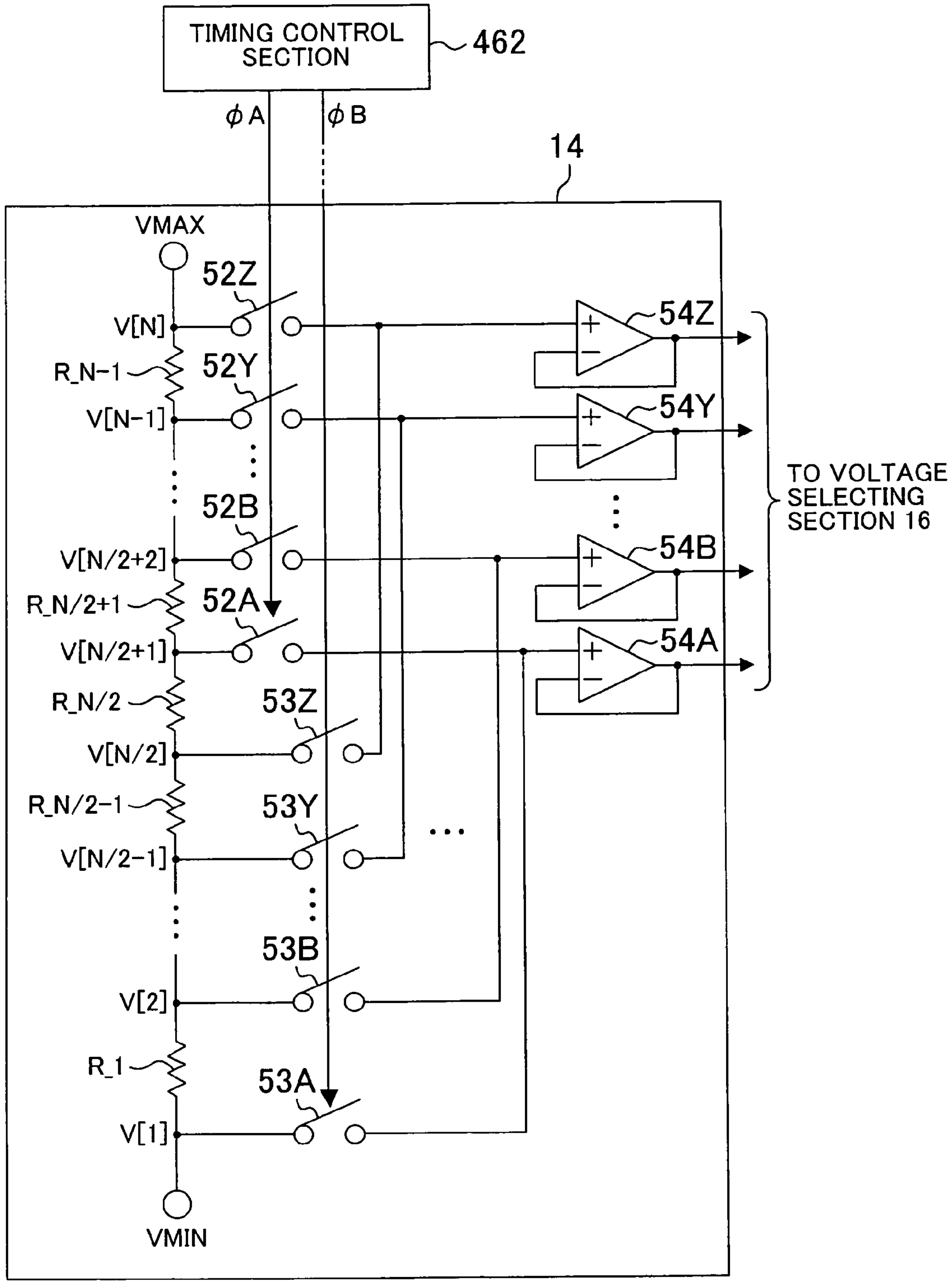
FIG. 9 is a circuit diagram illustrating a configuration of another variation of the intermediate voltage generating section of FIG. 2.

FIG. 9 is a circuit diagram illustrating a configuration of another variation of the intermediate voltage generating section 14 of FIG. 2. It is here assumed that a timing control section 462 is further provided in the voltage generating system of FIG. 1. The intermediate voltage generating section 14 of FIG. 9 is the same as that of FIG. 4, except that timing control signals ϕA and ϕB are provided instead of the chip identifying signals PR and SE. Specifically, the timing control signal ϕA is input to the intermediate voltage generating section 14 of the voltage generating device 10, while the timing control signal ϕB is input to the intermediate voltage generating section 14 of the voltage generating device 20.

Figure 10:
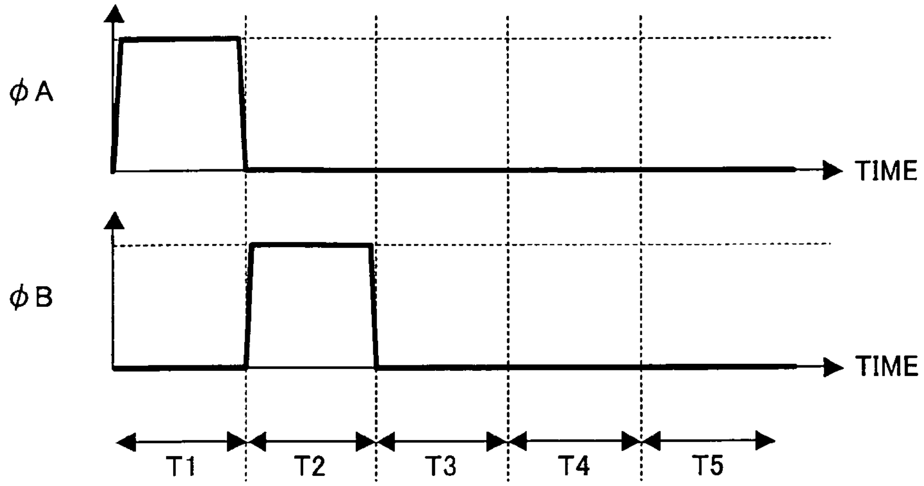
FIG. 10 is a timing chart of signals output by a timing control section of FIG. 8.

FIG. 10 is a timing chart of signals output by the timing control section 462 of FIG. 8. The timing control section 462 generates and outputs the timing control signals ϕA and ϕB which have alternating active periods as illustrated in FIG. 10. The switches 52A to 52Z are turned ON when the timing control signal ϕA is active, and the switches 53A to 53Z are turned ON when the timing control signal ϕB is active. Lengths of periods during which the timing control signals ϕA and ϕB are "H" are represented by T1 and T2. It is here assumed that periods T3, T4 and T5 have the same length as that of the period T1. The periods T1 to T5 satisfies T≧T1+T2+ . . . +T5 where T is the display cycle of the display device 2.

Initially, the timing control section 462 causes the timing control signal ϕA to go to "H". In the voltage generating device 10, the buffers 54Z to 54A impedance-convert the input voltages V[N], V[N−1], . . . , and V[N/2+1], respectively, and output the respective results to the voltage selecting section 16 and the voltage generating device 20.

Thereafter, the timing control section 462 causes the timing control signal ϕB to go to "H". In the voltage generating device 20, the buffer 54Z to 54A impedance-convert the input voltages V[N/2], V[N/2−1], . . . , and V[1], respectively, and output the respective results to the voltage selecting section 16 and the voltage generating device 10. The voltage selecting sections 16 of the voltage generating devices 10 and 20 each select voltages required for the display device 2 and output the selected voltages to the display device 2.

Also in this case, the number of buffers required for each voltage generating device is N/2, but not N. Therefore, as compared to when all of the voltages V[1:N] are generated by each voltage generating device, the power consumption and the circuit area can be reduced.

Although it has been described above that the voltages V[1:N] may be divided into a group of higher voltages (the voltages V[N] to V[N/2+1]) and a group of lower voltages (the voltages V[N/2] to V[1]), other ways to divide the voltages V[1:N] may be employed. For example, the voltages V[1:N] may be divided into a group obtained by selecting every other voltage, and a group of the remaining voltages.

Second Embodiment

Figure 11:
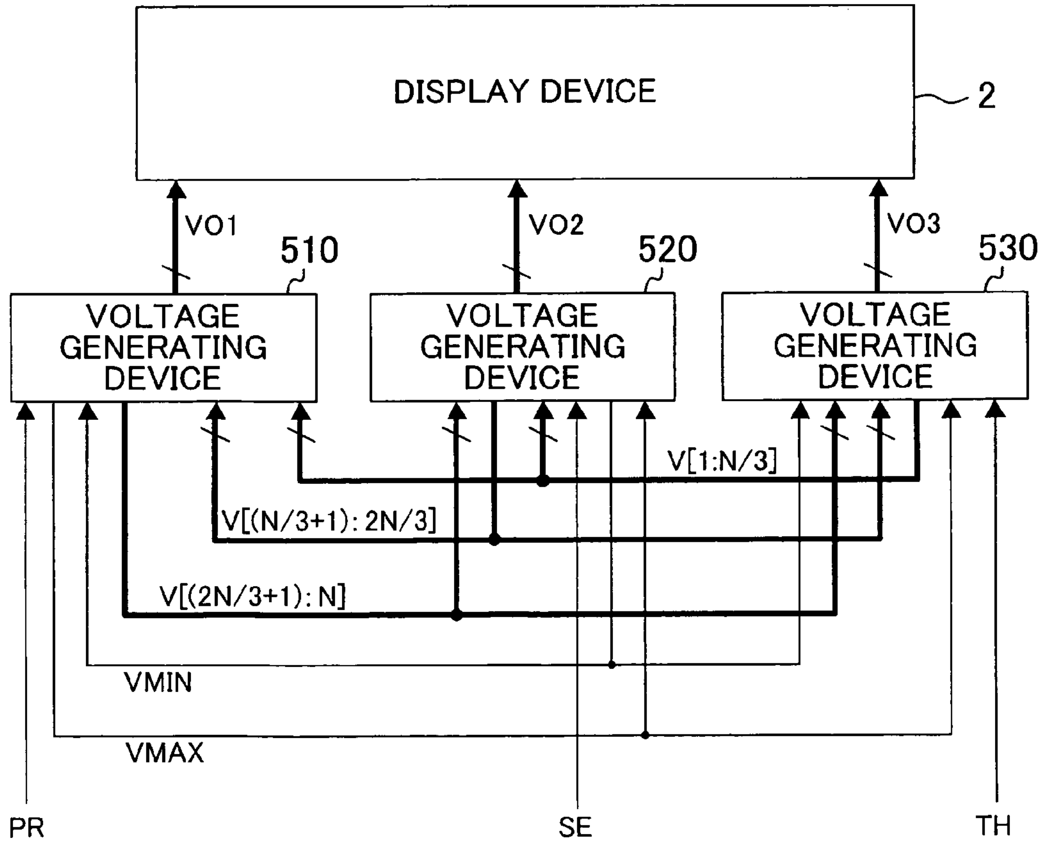
FIG. 11 is a block diagram illustrating a configuration of a voltage generating system according to a second embodiment of the present invention.

FIG. 11 is a block diagram illustrating a configuration of a voltage generating system according to a second embodiment of the present invention. The voltage generating system of FIG. 11 comprises voltage generating devices 510, 520 and 530. The voltage generating device 510 generates and supplies a maximum voltage VMAX to the voltage generating devices 520 and 530. The voltage generating device 520 generates and supplies a minimum voltage VMIN to the voltage generating devices 510 and 530.

Based on the maximum voltage VMAX and the minimum voltage VMIN, the voltage generating device 510 generates a plurality of voltages between these voltages, and supplies the generated voltages as voltages V[(2N/3+1): N] to the voltage generating devices 520 and 530. Based on the maximum voltage VMAX and the minimum voltage VMIN, the voltage generating device 520 generates a plurality of voltages (voltages different from the voltages V[(2N/3+1): N]) between these voltages, and outputs the generated voltages as voltages V[(N/3+1): 2N/3] to the voltage generating devices 510 and 530.

Based on the maximum voltage VMAX and the minimum voltage VMIN, the voltage generating device 530 generates a plurality of voltages (voltages different from the voltages V[(N/3+1): N]) between these voltages, and supplies the generated voltages as voltages V[1:N/3] to the voltage generating devices 510 and 520. The voltages V[1:N] may include the maximum voltage VMAX and the minimum voltage VMIN.

The voltage generating devices 510, 520 and 530 select voltages required for the display device 2 from the voltages V[1:N], and output the selected voltages as voltages VO1, VO2 and VO3 to the display device 2, respectively.

Whereas the two voltage generating devices 10 and 20 each generate a corresponding ½ of the voltages V[1:N] in the voltage generating system of FIG. 1, the three voltage generating devices 510, 520 and 530 each generate a corresponding ⅓ of the voltages V[1:N] in the voltage generating system of FIG. 11. The voltage generating devices 510,520 and 530 have the same configuration. The configuration operates as the voltage generating device 510 when a chip identifying signal PR is "H", as the voltage generating device 520 when a chip identifying signal SE is "H", and as the voltage generating device 530 when a chip identifying signal TH is "H". In the other regards, the voltage generating system of FIG. 11 is similar to that of FIG. 1, and will not be described in detail.

According to the voltage generating system of FIG. 11, even when the three voltage generating devices 510, 520 and 530 are provided, a deviation in voltages output by the voltage generating devices 510, 520 and 530 can be eliminated. The number of buffers required for each voltage generating device is N/3. Therefore, as compared to when all of the voltages V[1:N] are generated in each voltage generating device, the power consumption and the circuit area can be reduced.

Figure 12:
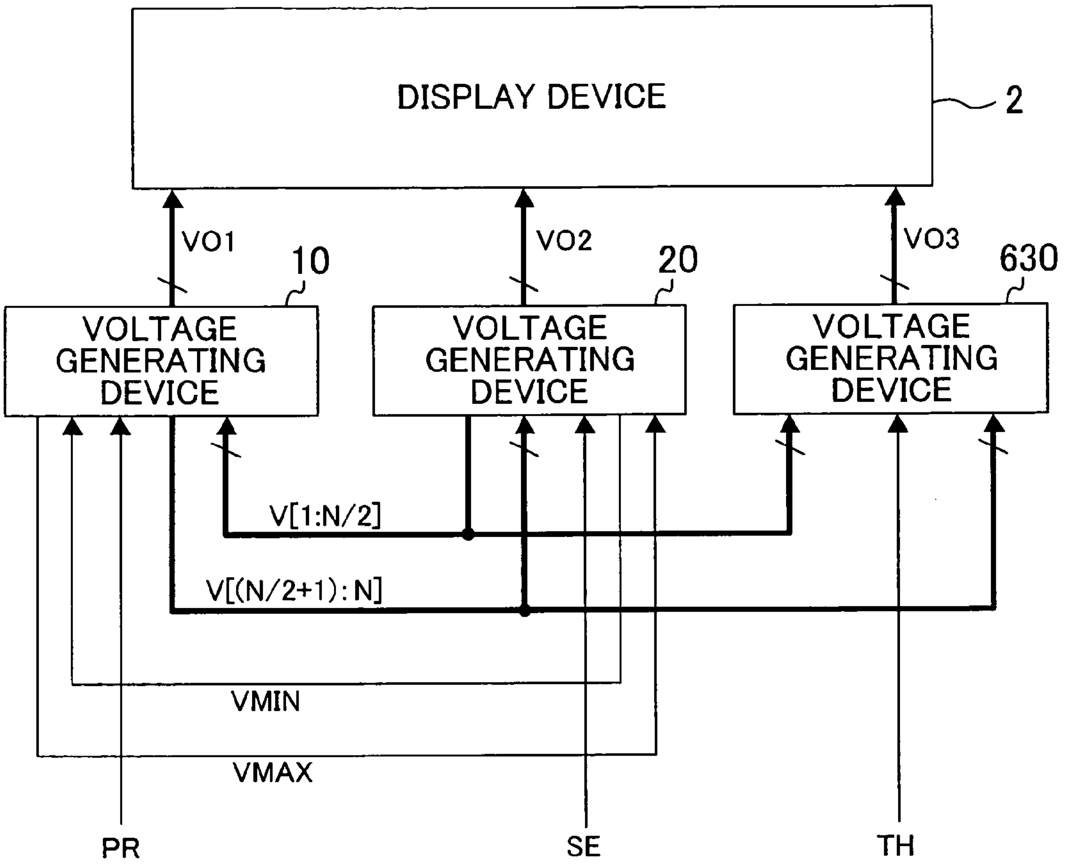
FIG. 12 is a block diagram illustrating a configuration of a variation of the voltage generating system of the second embodiment.

FIG. 12 is a block diagram illustrating a configuration of a variation of the voltage generating system of this embodiment. The voltage generating system of FIG. 12 is the same as the voltage generating system of FIG. 1, except that a voltage generating device 630 is further provided. The voltage generating device 630 receives the voltages V[(N/2+1): N] from the voltage generating device 10, and the voltages V[1:N/2] from the voltage generating device 20, and selects voltages required for the display device 2 from the voltages V[1:N], and outputs the selected voltages to the display device 2.

Since the voltage generating device 630 does not need to generate a voltage, the power consumption and the circuit area can be reduced in the voltage generating system of FIG. 12 to a greater extent than in the voltage generating system of FIG. 11.

Although it has been described above that there are two or three voltage generating devices, a larger number of voltage generating devices may be provided.

Figure 13:
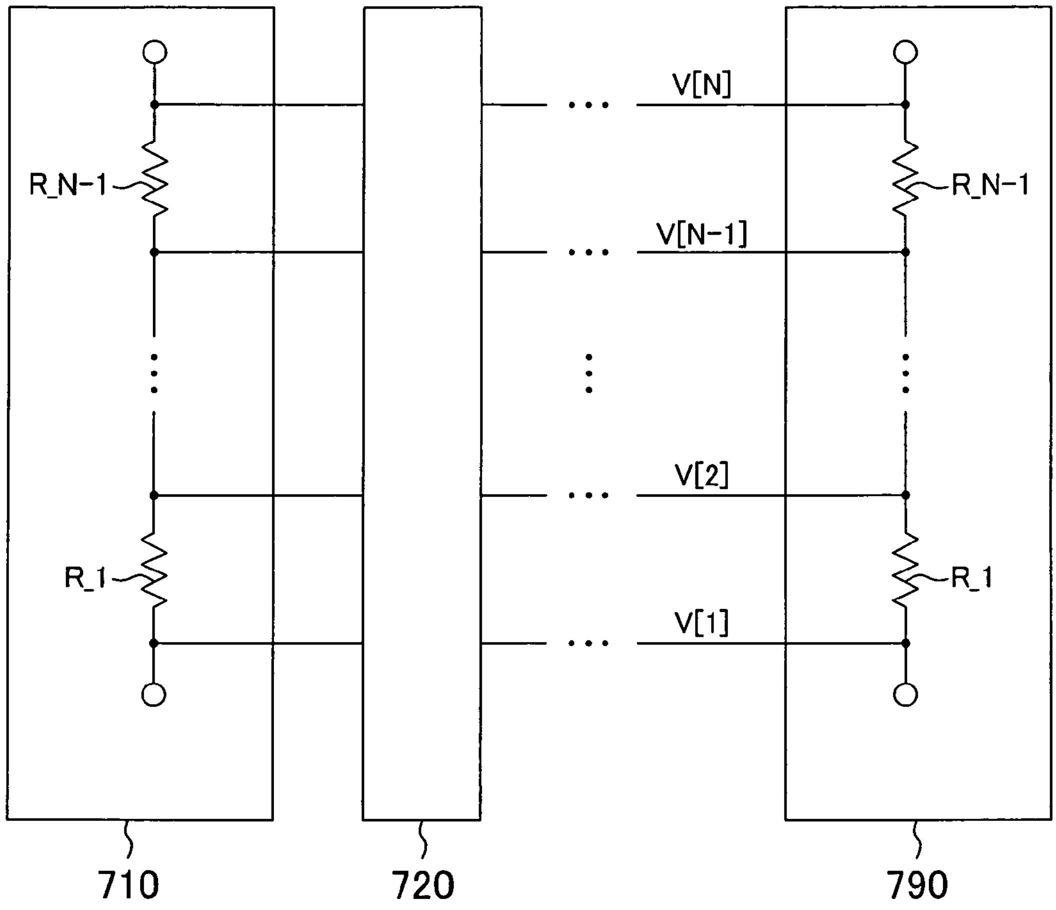
FIG. 13 is a circuit diagram illustrating the case where a plurality of nodes which should have the same voltage are connected between a plurality of voltage generating devices.
Figure 14:
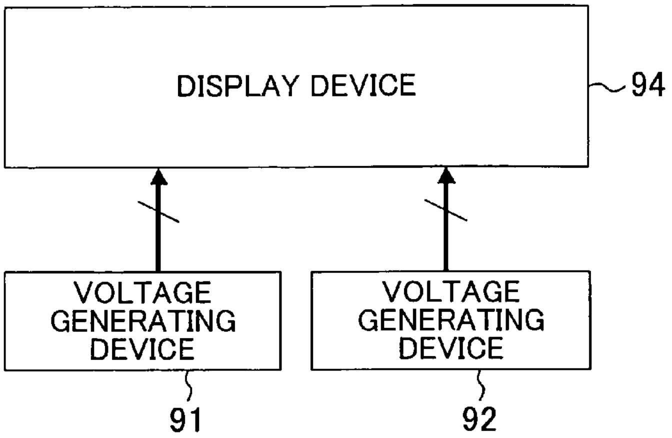
FIG. 14 is a block diagram illustrating a configuration of a conventional voltage generating system.
Figure 15:
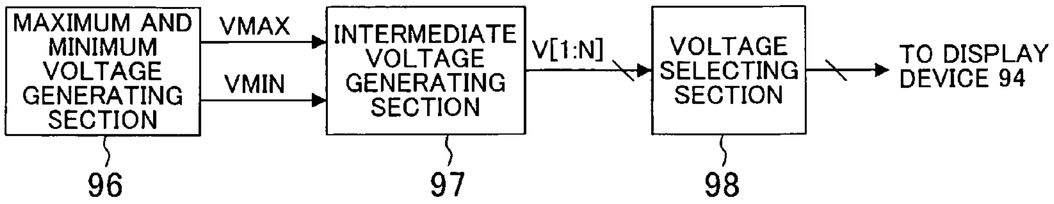
FIG. 15 is a block diagram illustrating an exemplary configuration of a voltage generating device of FIG. 14.

FIG. 13 is a circuit diagram illustrating the case where a plurality of nodes which should have the same voltage are connected between a plurality of voltage generating devices. A voltage generating system comprises voltage generating devices 710, 720, . . . , and 790, and drives the display device 2. The voltage generating devices 710, 720, . . . , and 790 each comprise N−1 resistors R_1, . . . , and R_N−1, and generate a voltage to be output to the display device 2. In the voltage generating devices 710, 720, . . . , and 790, as illustrated in FIG. 13, a set of nodes which should have a voltage V[1] are connected together, a set of nodes which should have a voltage V[2] are connected together, . . . , a set of nodes which should have a voltage V[N−1] are connected together, and a set of nodes which should have a voltage V[N] are connected together.

In this case, a deviation in the intermediate voltage between a number of voltage generating devices can be substantially eliminated, thereby making it possible to reduce a variation in voltage between each voltage generating device due to a variation in values of resistors, and improve the accuracy of voltages to a greater extent than in FIG. 6.

As described above, the present invention is useful as a voltage generating system for driving a display device or the like. For example, the present invention is useful as a voltage generating system for use in a display device which employs a liquid crystal display device, or an organic or inorganic EL device.

What is claimed is:

1. A voltage generating system comprising:

a first voltage generating device for generating a plurality of voltages between a maximum voltage and a minimum voltage as a first set of voltages; and a second voltage generating device for generating a plurality of voltages between the maximum voltage and the minimum voltage as a second set of voltages, the second set of voltages being different from the first set of voltages, wherein the first voltage generating device generates the maximum voltage, and supplies the first set of voltages and the maximum voltage to the second voltage generating device, the second voltage generating device generates the minimum voltage, and supplies the second set of voltages and the minimum voltage to the first voltage generating device, and the first and second voltage generating devices each select a voltage from the first and second sets of voltages, and output the selected voltage, wherein the first voltage generating device comprises:

a first voltage generating section for generating the maximum voltage;

a first intermediate voltage generating section for, based on the maximum voltage and the minimum voltage, generating as the first set of voltages a plurality of voltages which are lower than or equal to the maximum voltage and are higher than a voltage at a middle point between the maximum voltage and the minimum voltage; and a first voltage selecting section for selecting a voltage from the first and second sets of voltages and outputting the selected voltage, and the second voltage generating device comprises:

a second voltage generating section for generating the minimum voltage;

a second intermediate voltage generating section for, based on the maximum voltage and the minimum voltage, generating as the second set of voltages a plurality of voltages which are higher than or equal to the minimum voltage and are lower than or equal to the voltage at the middle point; and a second voltage selecting section for selecting a voltage from the first and second sets of voltages and outputting the selected voltage.

2. The voltage generating system of claim 1, wherein the first and second intermediate voltage generating sections each have:

a resistor circuit including a plurality of resistors connected in series;

a first set of switches connected to respective nodes having voltages higher than the voltage at the middle point, of a plurality of nodes of the resistor circuit;

a second set of switches connected to respective nodes lower than or equal to the voltage at the middle point, of the plurality of nodes of the resistor circuit; and a plurality of buffers connected to the first set of switches, respectively, and to the second set of switches, respectively, and for impedance-converting respective input voltages and outputting the respective results, wherein the first set of switches are turned ON in the first intermediate voltage generating section, and the second set of switches are turned ON in the second intermediate voltage generating section.

3. The voltage generating system of claim 2, further comprising:

a timing control section for generating first and second timing control signals having alternating active periods, wherein the first set of switches are turned ON in the first intermediate voltage generating section when the first timing control signal is active, and the second set of switches are turned ON in the second intermediate voltage generating section when the second timing control signal is active.

4. The voltage generating system of claim 1, further comprising:

a timing control section for generating a plurality of timing control signals having successive active periods, wherein the first intermediate voltage generating section has:

a resistor circuit including a plurality of resistors connected in series;

a plurality of switches connected to a plurality of nodes of the resistor circuit, respectively, and corresponding to the plurality of timing control signals, respectively; and a buffer connected to the plurality of switches, and the plurality of switches are turned ON when the respective corresponding timing control signals are active, and the buffer impedance-converts a voltage output from an ON-state switch of the plurality of switches, and outputting the result.

5. The voltage generating system of claim 1, wherein, between the first intermediate voltage generating section and the second intermediate voltage generating section, a pair of nodes which should have the same voltage other than the maximum voltage and the minimum voltage are connected together.

6. The voltage generating system of claim 1, further comprising:

a third voltage generating device for selecting a voltage from the first and second sets of voltages and outputting the selected voltage.

7. A voltage generating system comprising:

a first voltage generating device for generating a plurality of voltages between a maximum voltage and a minimum voltage as a first set of voltages; and a second voltage generating device for generating a plurality of voltages between the maximum voltage and the minimum voltage as a second set of voltages, the second set of voltages being different from the first set of voltages, wherein the first voltage generating device generates the maximum voltage, and supplies the first set of voltages and the maximum voltage to the second voltage generating device, the second voltage generating device generates the minimum voltage, and supplies the second set of voltages and the minimum voltage to the first voltage generating device, the first and second voltage generating devices each select a voltage from the first and second sets of voltages, and output the selected voltage, and the first and second voltage generating devices have the same configuration, and the same configuration operates as the first voltage generating device when receiving an identification signal indicating that the same configuration should operate as the first voltage generating device, and as the second voltage generating device when receiving an identification signal indicating that the same configuration should operate as the second voltage generating device.

8. A voltage generating system comprising:

a first voltage generating device for generating a plurality of voltages between a maximum voltage and a minimum voltage as a first set of voltages;

a second voltage generating device for generating a plurality of voltages between the maximum voltage and the minimum voltage as a second set of voltages, the second set of voltages being different from the first set of voltages; and a third voltage generating device for generating a plurality of voltages between the maximum voltage and the minimum voltage as a third set of voltages, the third set of voltages being different from the first and second sets of voltages, wherein the first voltage generating device generates the maximum voltage, and supplies the first set of voltages and the maximum voltage to the second and third voltage generating devices, the second voltage generating device generates the minimum voltage, and supplies the second set of voltages and the minimum voltage to the first and third voltage generating devices, the third voltage generating device supplies the third set of voltages to the first and second voltage generating devices, the first to third voltage generating devices each select a voltage from the first to third sets of voltages, and output the selected voltage, and the first to third voltage generating devices have the same configuration, and the same configuration operates as the first voltage generating device when receiving an identification signal indicating that the same configuration should operate as the first voltage generating device, as the second voltage generating device when receiving an identification signal indicating that the same configuration should operate as the second voltage generating device, and as the third voltage generating device when receiving an identification signal indicating that the same configuration should operate as the third voltage generating device.

* * * * *